United States Patent
Bragg et al.

[11] Patent Number: 6,136,075
[45] Date of Patent: Oct. 24, 2000

[54] AUTOMOTIVE EVAPORATIVE EMISSIONS CANISTER ADSORPTIVE RESTRAINT SYSTEM

[75] Inventors: Bruce Barton Bragg, Newport; Leonard Robert Lindstrom, Covington; Roger Shaw Williams, Lexington, all of Va.

[73] Assignee: Westvaco Corporation, New York, N.Y.

[21] Appl. No.: 09/304,323

[22] Filed: May 3, 1999

[51] Int. Cl.[7] .................................................. B01D 53/04
[52] U.S. Cl. .............................. 96/135; 96/137; 96/149; 96/153; 55/519; 55/DIG. 42
[58] Field of Search ........................ 55/514, 518, 519, 55/DIG. 42; 96/108, 135, 137, 149, 153, 154

[56] References Cited

U.S. PATENT DOCUMENTS

| | | | |
|---|---|---|---|
| 2,945,554 | 7/1960 | Berly | 96/135 |
| 3,617,034 | 11/1971 | Skinner | 261/22 |
| 3,672,180 | 6/1972 | Davis | 62/54 |
| 3,673,997 | 7/1972 | Sawada | 123/136 |
| 3,675,634 | 7/1972 | Tatsutomi et al. | 123/136 |
| 3,683,597 | 8/1972 | Beveridge et al. | 55/518 X |
| 3,696,799 | 10/1972 | Gauck | 123/136 |
| 3,728,846 | 4/1973 | Nilsson | 55/519 X |
| 3,944,403 | 3/1976 | Simpson et al. | 96/149 X |
| 4,000,727 | 1/1977 | Walker | 123/136 |
| 4,386,947 | 6/1983 | Mizuno et al. | 96/137 |
| 4,598,686 | 7/1986 | Lupoli et al. | 123/519 |
| 4,683,862 | 8/1987 | Fornuto et al. | 123/520 |
| 4,684,382 | 8/1987 | Abu-Isa | 55/316 |
| 4,714,485 | 12/1987 | Covert et al. | 55/189 |
| 4,750,465 | 6/1988 | Rediker, Jr. et al. | 123/519 |
| 4,853,009 | 8/1989 | Turner et al. | 55/387 |
| 4,894,072 | 1/1990 | Turner et al. | 55/179 |
| 4,906,263 | 3/1990 | von Blücher et al. | 96/135 |
| 4,992,084 | 2/1991 | von Blücher et al. | 96/153 X |
| 5,002,596 | 3/1991 | Moskaitis et al. | 96/153 X |
| 5,098,453 | 3/1992 | Turner et al. | 55/387 |
| 5,174,800 | 12/1992 | Schwilling et al. | 96/154 |
| 5,304,235 | 4/1994 | Watanabe et al. | 96/144 |
| 5,338,340 | 8/1994 | Kasmark, Jr. et al. | 96/135 |
| 5,453,118 | 9/1995 | Heiligman | 96/147 |
| 5,460,136 | 10/1995 | Yamazaki et al. | 123/519 |
| 5,478,377 | 12/1995 | Scavnicky et al. | 96/154 X |
| 5,564,398 | 10/1996 | Maeda et al. | 123/520 |
| 5,599,384 | 2/1997 | Yoshida et al. | 96/143 |
| 5,616,169 | 4/1997 | de Ruiter et al. | 96/135 X |
| 5,632,808 | 5/1997 | Hara et al. | 96/137 |
| 5,641,344 | 6/1997 | Takahashi et al. | 96/139 |
| 5,645,036 | 7/1997 | Matsumoto et al. | 123/519 |
| 5,653,788 | 8/1997 | Haruta | 96/144 |
| 5,716,432 | 2/1998 | Perrine | 96/135 |
| 5,718,209 | 2/1998 | Scardino et al. | 123/519 |
| 5,743,943 | 4/1998 | Maeda et al. | 96/126 |
| 5,871,569 | 2/1999 | Oehler et al. | 96/153 |

FOREIGN PATENT DOCUMENTS

| | | | |
|---|---|---|---|
| 3524431 | 1/1987 | Germany | 96/135 |
| 3719415 | 12/1988 | Germany | 96/135 |

*Primary Examiner*—Robert H. Spitzer
*Attorney, Agent, or Firm*—J. R. McDaniel; R. L. Schmalz

[57] ABSTRACT

This invention relates to automotive evaporative emissions canisters. Such structures of this type employ a carbon-filled foam which adds adsorptive performance to the canister without having to enlarge the canister or having to change the carbon in the canister to a higher performance carbon.

6 Claims, 1 Drawing Sheet

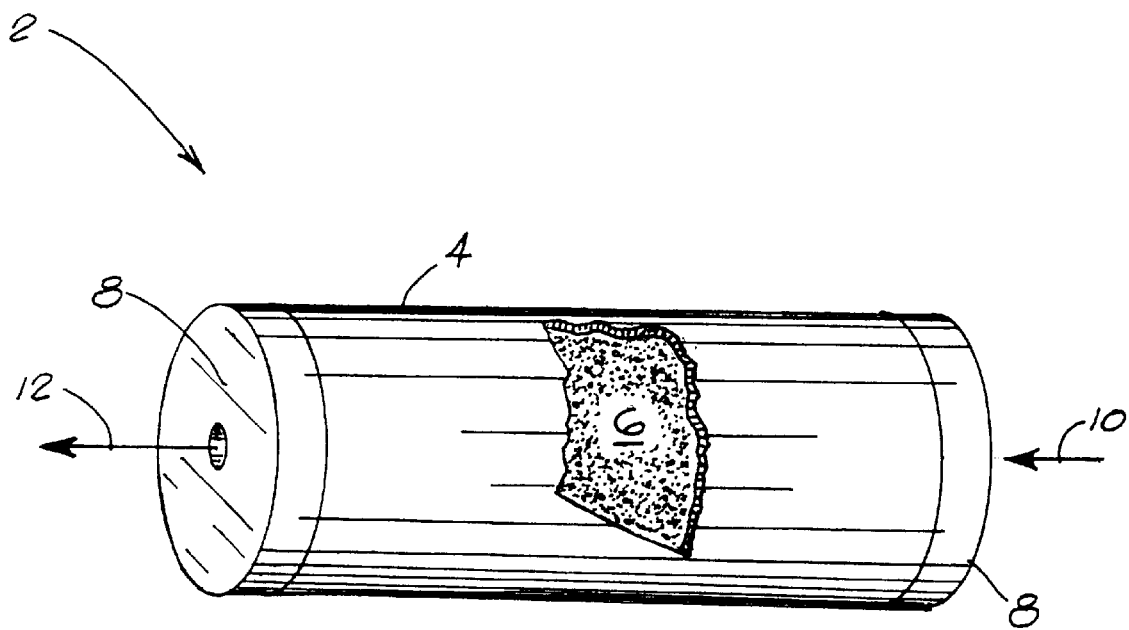
FIGURE

AUTOMOTIVE EVAPORATIVE EMISSIONS CANISTER ADSORPTIVE RESTRAINT SYSTEM

BACKGROUND OF THE INVENTION

1. Field of the Invention

This invention relates to automotive evaporative emissions canisters. Such structures of this type employ a carbon-filled foam which adds adsorptive performance to the canister without having to enlarge the canister or having to change the carbon in the canister to a higher performance carbon.

2. Description of the Related Art

Presently, in the automotive industry, there are concerns with canister designs because these canisters either sometimes pass or fail enhanced evaporative emissions tests. Changing of the canister design is usually considered expensive; therefore, other solutions that incorporate a standard design are sought.

One remedy is to use a higher activity carbon. Typically, this results in a 15–20% gain in gasoline working capacity (GWC). However, if the initial design specifies the higher activity carbon, only small gains in GWC can be achieved by substituting a carbon with a slightly higher butane working capacity (BWC). Also, the changing of the minimum BWC of the carbon will add only a small amount of GWC to the canister.

It is also known to employ porous filter materials to restrain the carbon and collect the dust. Exemplary of such prior art are U.S. Pat. No. 4,598,686 ('686) to P. J. Lupoli et al., entitled "Fuel Vapor Recovery System For Automotive Vehicles," U.S. Pat. No. 4,683,862 ('862) to J. Fornuto et al., entitled "Fuel Vapor Storage Canister," U.S. Pat. No. 4,853,009 ('009) to K. W. Turner et al., entitled "Multi Orientation Fuel Vapor Storage Canister Assembly," and U.S. Pat. No. 5,098,453 ('453) to K. W. Turner et al., entitled "Vapor Storage Canister With Volume Change Compensator." While the '686, '862, '009, and '453 references teach automotive evaporative emissions canisters, they employ the use of various types of "filters" which take up valuable space, but do not improve the GWC. Consequently, a more advantageous canister, then, would be presented if the foam could be reduced or modified.

Finally, it is known to employ a "formed block" of carbon in an automotive evaporative emissions canister. Exemplary of such prior art is U.S. Pat. No. 5,453,118 ('118) to R. B. Heiligman, entitled "Carbon-Filled Fuel Vapor Filter System." While the 118 reference employs the use of a formed block of pellets or granules of carbon, this whole bed of carbon must be glued together to form this rigid formed block. Consequently, a further advantageous canister, then, would be presented if this expensive forming step could be eliminated.

It is apparent from the above that there exists a need in the art for an automotive evaporative emissions canister which is lightweight through simplicity of parts and uniqueness of structure, and which at least equals the adsorptive characteristics of the known canisters, but which at the same time has an increased gasoline working capacity (GWC). It is the purpose of this invention to fulfill this and other needs in the art in a manner more apparent to the skilled artisan once given the following disclosure.

SUMMARY OF THE INVENTION

Generally speaking, this invention fulfills these needs by providing an automotive evaporative emissions adsorptive restraint device for canisters, comprising an automotive evaporative emissions canister having first and second ends, an activated carbon-filled, compressible, cellular plastic adsorptive restraint means having a gasoline working capacity of at least 2 grams located substantially at the first and second ends of the canister, and a bed of activated carbon located substantially within the canister and between the cellular plastic restraint means.

In certain preferred embodiments, the activated carbon-filled, compressible, cellular plastic restraint means is comprised of a carbon-filled foam. This can also be accomplished by a compressible, carbon-filled, non-woven fiber sheet. Also, the gasoline working capacity of the cellular plastic means is at least 3 grams. Finally, the weight-basis butane working capacity (BWC) of the cellular plastic means is at least 33%.

In another further preferred embodiment, the use of the carbon-filled, compressible, cellular plastic restraint means adds adsorptive performance to the canister without having to enlarge the canister or having to change the carbon in the canister to a higher performance carbon.

The preferred canister, according to this invention, offers the following advantages: lightness in weight; ease of assembly; good stability; good durability; excellent economy; increased gasoline working capacity; good particulate filtration; good bed restraint and reduced diffusion losses. In fact, in many of the preferred embodiments, these factors of ease of assembly, economy, increased gasoline working capacity, particulate filtration, reduced bleed losses, and bed restraint are optimized to an extent that is considerably higher than heretofore achieved in prior, known canister.

BRIEF DESCRIPTION OF THE DRAWING

The above and other features of the present invention, which will become more apparent as the description proceeds, are best understood by considering the following detailed description, in conjunction with the accompanying drawing, in which the single FIGURE is a schematic illustration of an automotive evaporative emissions canister having adsorptive restraint means, according to the present invention.

DETAILED DESCRIPTION OF THE INVENTION

With reference first to the FIGURE, there is illustrated an advantageous environment for use of the concepts of this invention. In particular, an automotive evaporative emissions canister adsorptive system 2, according to the present invention, is illustrated. This system 2 includes, in part, conventional canister 4, conventional bed 6 of pelletized/granular activated carbon, a pair of adsorptive restraint means 8, conventional inlet 10, and conventional outlet 12.

In order to prove the efficacy of system 2, the following Example was conducted:

EXAMPLE

A restraint device 8, conventionally filled with off-size carbon (20×50 mesh) was evaluated for butane working capacity (BWC) using a modified ASTM approach. The sample had a weight-basis butane activity of 36.3%. Since the conventionally constructed foam sheet is compressible, it was difficult to place a measurable "volume" of the material in a BWC tube. However, the best effort to do this resulted in a weight-basis BWC of 33.4%. The purge ratio was 0.92.

The restraint device 8 had an area of about 544.7 cm². The uncompressed depth of restraint device 8 was about 0.25 cm. Therefore, the volume of restraint device 8 was about 136.2 cm³. Restraint device 8 weighed 42.0 grams and the density was 0.308 g/ml. These values give a "BWC" of restraint device 8 of 10.3 g/100 ml.

A better way to look at the potential impact of the carbon-filled foam restraint device 8 is as follows. A typical canister has room for about 250 cm², or 19.3 grams of foam. This would translate to about 6.4 grams of "BWC." Using previously determined factors, it is estimated that the contribution to gasoline working capacity (GWC) would be about 3.1 grams. A 1.8 liter canister filled with conventional activated carbon would have a GWC of about 126 grams. Therefore, the addition of this type of carbon-filled foam restrain device 8 would increase the canister capacity by 2.5%.

Clearly, along with the increase in GWC in the canister due to the use of restraint devices 8, restraint devices 8 also compensate for the volume of carbon bed 6 through their elasticity. Restraints 8 also are capable of filtering as well as the previously discussed filters. Also, restraint devices 8 keep carbon bed 6 from making any significant movement. Finally, restraint devices 8 assist in gas flow through canister 4, help to prevent channeling, and reduce diffusion losses.

Finally, it must be pointed out that while in the above Example, a 2.5% increase in GWC was achieved, this increase would clearly go up if a larger canister was used. Also, it must be pointed out that the emissions from a typical automobile fuel tank is approximately 2 grams of gasoline vapor. Out of that 2 grams, the canister may only admit on the order of tenths of grams. This increase of GWC by 6.4 grams, in the above described Example, provides a degree of cushion so that the canister will not go above the amount of gasoline vapor that the canister can emit.

It is to be understood that through the use of alternative carbons in restraint 8, bleed emissions, due to diffusion or canister bed inefficiencies, can be reduced.

Once given the above disclosure, many other features, modifications or improvements will become apparent to the skilled artisan. Such features, modifications or improvements are therefore, considered to be a part of this invention, the scope of which is to be determined by the following claims.

What is claimed is:

1. An automotive evaporative emissions canister adsorptive restraint devices for canisters, wherein said canister is comprised of:

an automotive evaporative emissions canister having first and second ends;

an activated carbon-filled, compressible, cellular plastic adsorptive restraint means having a gasoline working capacity of at least 2 grams located substantially at said first and second ends of said canister; and a bed of activated carbon located substantially within said canister and between said cellular plastic restraint means.

2. The device, as in claim 1, wherein said restraint means is further comprised of:

carbon-filled foam.

3. The device, as in claim 1, wherein said restraint means is further comprised of:

carbon-filled, non-woven fiber sheet.

4. The device, as in claim 1, wherein said restraint means has a gasoline working capacity of at least 3 grams.

5. The device, as in claim 1, wherein said restraint means has a weight basis butane working capacity of at least 25%.

6. The device, as in claim 1, wherein said restraint means has a weight basis butane working capacity of at least 33%.

* * * * *